United States Patent
Hauck et al.

(10) Patent No.: US 11,441,924 B2
(45) Date of Patent: Sep. 13, 2022

(54) METHOD AND DEVICE FOR DETECTING THE STANDSTILL OF A VEHICLE

(71) Applicant: Robert Bosch GmbH, Stuttgart (DE)

(72) Inventors: Kevin Hauck, Epfenbach (DE); Sebastian Roith, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 261 days.

(21) Appl. No.: 16/473,050

(22) PCT Filed: Jan. 24, 2018

(86) PCT No.: PCT/EP2018/051662
§ 371 (c)(1),
(2) Date: Jun. 24, 2019

(87) PCT Pub. No.: WO2018/149601
PCT Pub. Date: Aug. 23, 2018

(65) Prior Publication Data
US 2020/0088543 A1    Mar. 19, 2020

(30) Foreign Application Priority Data
Feb. 16, 2017   (DE) .................. 10 2017 202 539.5

(51) Int. Cl.
*G01C 25/00* (2006.01)
*G01C 21/16* (2006.01)

(52) U.S. Cl.
CPC .......... *G01C 25/005* (2013.01); *G01C 21/16* (2013.01)

(58) Field of Classification Search
None
See application file for complete search history.

(56) References Cited

U.S. PATENT DOCUMENTS

2008/0154495 A1* 6/2008 Breed ................... G01C 21/20
701/472
2008/0234933 A1* 9/2008 Chowdhary .......... G01C 21/12
701/479

(Continued)

FOREIGN PATENT DOCUMENTS

EP  0 488 594 A1    6/1992
EP    0488594 A1 *  6/1992

(Continued)

OTHER PUBLICATIONS

International Search Report corresponding to PCT Application No. PCT/EP2018/051662, dated Apr. 25, 2018 (German and English language document) (5 pages).

*Primary Examiner* — Khoi H Tran
*Assistant Examiner* — Tristan J Greiner
(74) *Attorney, Agent, or Firm* — Maginot, Moore & Beck LLP

(57) ABSTRACT

The disclosure relates to a method for detecting a standstill of a vehicle, said method comprising a step of filtering, a step of normalizing and a step of observing. In the filtering step, an acceleration value in a first axis of the vehicle and a rotational speed value about a second axis of the vehicle, oriented orthogonally to the axis, are filtered using a filter specification in order to obtain a filtered acceleration value and a filtered rotational speed value. In the normalizing step, the filtered acceleration value and the filtered rotational speed value are normalized using a normalization specification in order to obtain a normalized acceleration value and a normalized rotational speed value. In the observation step, the normalized acceleration value and the normalized rotational speed value are observed using an observation specification in order to detect the standstill.

11 Claims, 5 Drawing Sheets

(56) References Cited

U.S. PATENT DOCUMENTS

| | | | | |
|---|---|---|---|---|
| 2009/0248346 A1* | 10/2009 | Fennel | ................... | G01C 25/00 |
| | | | | 702/96 |
| 2010/0106451 A1* | 4/2010 | Sugihara | .............. | G01C 25/005 |
| | | | | 702/147 |
| 2010/0138180 A1* | 6/2010 | Sugihara | .................. | B25J 9/163 |
| | | | | 702/145 |
| 2017/0261336 A1* | 9/2017 | Schmidt | ............... | G01C 25/005 |

FOREIGN PATENT DOCUMENTS

| | | | |
|---|---|---|---|
| JP | 3018497 | B2 | 3/2000 |
| JP | 2002-131077 | A | 5/2002 |
| JP | 2007-163205 | A | 6/2007 |
| JP | 2009-168757 | A | 7/2009 |
| JP | 2011-112551 | A | 6/2011 |
| JP | 2012-163465 | A | 8/2012 |
| JP | 2012-173143 | A | 9/2012 |
| JP | 2013-250064 | A | 12/2013 |
| JP | 5625557 | B2 | 11/2014 |
| JP | 6154883 | B2 | 6/2017 |
| JP | 6222096 | B2 | 11/2017 |
| KR | 2004-0040155 | A | 5/2004 |
| KR | 20040040155 | A * | 5/2004 |

* cited by examiner

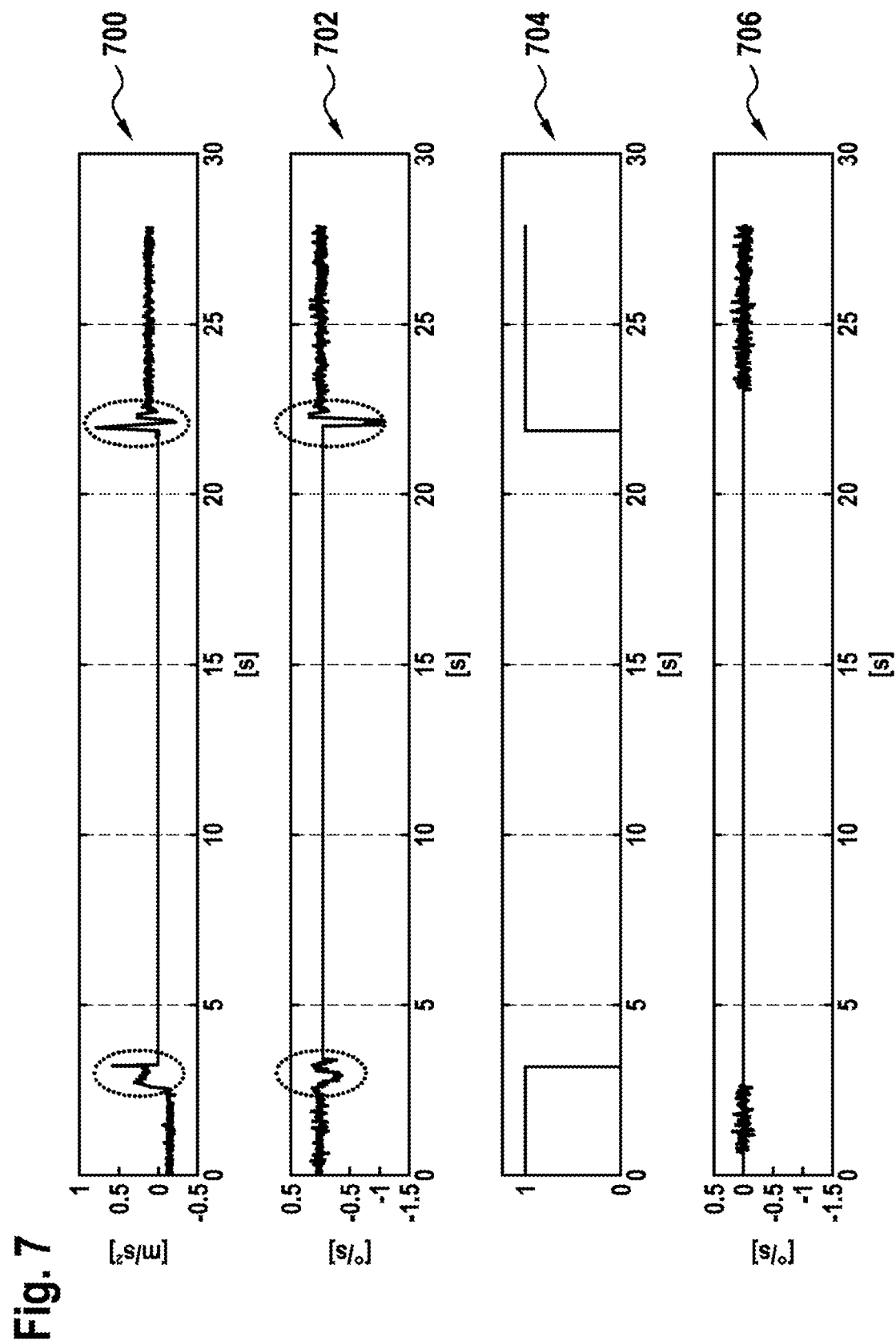

METHOD AND DEVICE FOR DETECTING THE STANDSTILL OF A VEHICLE

This application is a 35 U.S.C. § 371 National Stage Application of PCT/EP2018/051662, filed on Jan. 24, 2018, which claims the benefit of priority to Serial No. DE 10 2017 202 539.5, filed on Feb. 16, 2017 in Germany, the disclosures of which are incorporated herein by reference in their entirety.

BACKGROUND

The disclosure is based on a device or on a method for detecting a standstill of a vehicle. The subject matter of the present disclosure is also a computer program.

Inertial sensors can be affected by drift. In order to compensate the drift of a sensor, a point in time can be used at which the signal of the sensor should have a known value. For example, said point in time can be when a vehicle is at a standstill.

SUMMARY

Against this background, with the approach presented here a method for detecting a standstill of a vehicle, and also a device that uses said method, as well as finally a corresponding computer program are presented. By means of the measures listed in particular embodiments of the disclosure, advantageous further developments and improvements of the device are possible.

The standstill of a vehicle can be detected by a data fusion of at least two different sensors. Based on a combination of at least one accelerometer signal and at least one rotational speed signal, the standstill can be detected with high reliability.

It is a method for detecting a standstill of a vehicle, wherein the method comprises the following steps:
filtering an acceleration value in a first axis of the vehicle and filtering a rotational speed value about a second axis of the vehicle that is oriented orthogonally to the axis using a filter specification to obtain a filtered acceleration value and a filtered rotational speed value;
normalizing the filtered acceleration value and the filtered rotational speed value using a normalizing specification to obtain a normalized acceleration value and a normalized rotational speed value; and
observing the normalized acceleration value and the normalized rotational speed value using an observation specification to detect the standstill.

An acceleration value can be transmitted by means of an acceleration signal of an accelerometer. A rotational speed value can be transmitted by means of a rotational speed signal of a rotational speed sensor. A profile of the values can be smoothed out by means of the filter specification. By means of a normalization, the values can be transformed in such a way that they can be set in relation to each other. The normalization specification be a transformation, for example a z-transformation. By means of the normalization specification, the filtered acceleration value and the filtered rotational speed value can be transformed in such a way that the values resulting from the normalization can be compared with each other. The normalization can include at least one normalization factor to be used in such a transformation. According to the observation specification, the normalized acceleration value or a value dependent on the normalized acceleration can be compared with a limit value. Additionally or alternatively, the normalized rotational speed value or a value dependent on the normalized rotational speed value can be compared with the or a further limit value according to the observation specification. Depending on a result the comparison or the comparisons, the standstill is considered to be detected or not detected. For example, the standstill can be considered to be detected if the comparison(s) carried out according to the observation specification do(es) not produce a case in which the limit value is exceeded.

The acceleration value and/or the rotational speed value can be averaged over a third time interval if the standstill is detected to obtain an acceleration range and/or a rotational speed range. A movement of the vehicle can be detected if the acceleration range and/or the rotational speed range exceeds a limit value. A range can be a range of values within the third time interval. The range indicates the dynamics of the signal.

The acceleration value and/or the rotational speed value can be averaged over a dynamic time range to obtain the filtered acceleration value and/or the filtered rotational speed value if a movement is detected. Averaging allows outliers to be smoothed up and down.

For a minimum time period no standstill can be detected if a movement is detected. The detection reliability can be increased by waiting after a movement.

The standstill can be detected if a sum of the normalized acceleration value and the normalized rotational speed value is less than a standstill value. Also a change of the normalized acceleration value and a change of the normalized rotational speed value can be summed and compared with the standstill value. The observation can be carried out simply and quickly by a decision on larger or smaller.

Another acceleration value in the second axis and a further rotational speed value about a third axis oriented orthogonally to the first and second axes of the vehicle can be filtered using the filter specification to obtain a further filtered acceleration value and to obtain a further filtered rotational speed value.

The further filtered acceleration value and the further filtered rotational speed value can be normalized using the normalization specification to obtain a further normalized acceleration value and to obtain a further normalized rotational speed value. The further normalized acceleration value and the further normalized rotational speed value can be observed using the observation specification to detect the standstill. Multi-axis observation can detect the standstill with increased reliability.

The standstill can be detected if a wheel rotational speed value representing at least one wheel rotational speed of the vehicle is less than a wheel standstill value. By using the wheel rotational speed the standstill detection can be made more reliable.

The standstill can be detected if no controller of the vehicle is active. A natural movement of the vehicle can be disrupted by control interventions. As a result, a false detection can occur. Said false detections can be ignored.

This method can be implemented, for example, in software or hardware or in a mixed form of software and hardware, for example in a control unit.

The approach presented here also produces a device that is embodied to carry out, control or implement the steps of a version of the method presented here in appropriate devices. Also the object of the disclosure can be achieved rapidly and efficiently using this embodiment version of the disclosure in the form of a device.

For this purpose, the device can comprise at least one computer unit for processing signals or data, at least one memory unit for storing signals or data, at least one interface to a sensor or an actuator for reading sensor signals from the sensor or to output data or control signals to the actuator and/or at least one communication interface for reading or outputting data that are embedded in a communication protocol. For example, the computing unit may be a signal processor, a microcontroller or the like, wherein the memory may be a flash memory, an EEPROM or a magnetic memory unit. The communication interface may be embodied to read or output data wirelessly and/or by wire, wherein a communication interface that can read in or output the wired data, for example, can read in said data electrically or optically from a corresponding data transmission line or output said data into a corresponding data transmission line.

In the present case a device can be understood to mean an electrical device that processes sensor signals and depending thereon outputs control and/or data signals. The device can comprise an interface that can be implemented in hardware and/or software. In a hardware embodiment, for example, the interfaces can be part of a so-called system ASIC containing the most diverse functions of the device. However, it is also possible that the interfaces comprise their own integrated circuits or consist at least partly of discrete components. In a software technology embodiment, the interfaces can be software modules, which for example are provided on a microcontroller with other software modules.

A computer program product or computer program with program code is also advantageous that can be stored on a machine-readable medium or memory medium such as a semiconductor memory, a disk memory or an optical memory and that is used for carrying out, implementation and/or activation of the steps of the method according to any one of the embodiments described above, especially if the program product or program is run on a computer or a device.

BRIEF DESCRIPTION OF THE DRAWINGS

Exemplary embodiments of the approach presented here are represented in the drawings and explained in more detail in the following description. In the figures:

FIGS. 4 to 7 show representations of signal profiles during detection of a standstill of a vehicle according to an exemplary embodiment.

DETAILED DESCRIPTION

Figure 1:
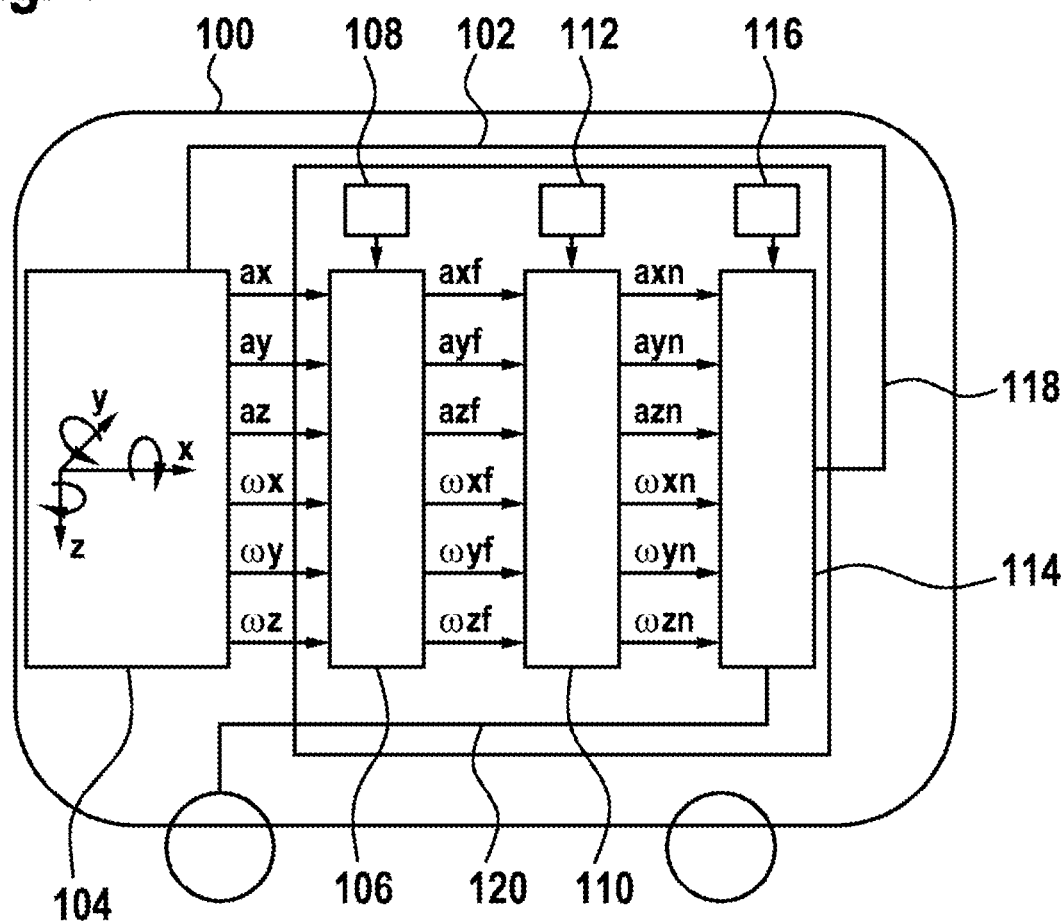
FIG. 1 shows a block diagram of a vehicle with a device for detecting a standstill of the vehicle according to an exemplary embodiment.

In the following description of favorable exemplary embodiments of the disclosure, the same or similar reference characters are used for the various similar elements represented in the figures, wherein a repeated description of these elements is dispensed with.

FIG. 1 shows a block diagram of a vehicle 100 with a device 102 for detecting a standstill of the vehicle 100 according to an exemplary embodiment. The vehicle 100 comprises a sensor device 104 to detect acceleration values $a_x$, $a_y$, $a_z$ in three axes x, y, z of the vehicle 100 and rotational speed values $\omega_x$, $\omega_y$, $\omega_z$ about the three axes x, y, z. The three axes x, y, z are orthogonal to each other, wherein the x-axis can be called the vehicle's longitudinal direction, the y-axis can be called the vehicle's transverse direction and the z-axis can be called the vehicle's vertical direction. The acceleration values $a_x$, $a_y$, $a_z$ form acceleration components currently acting on the vehicle 100 in the direction of the x, y, z axes of a total acceleration. The rotational speed values $\omega_x$, $\omega_y$, $\omega_z$ form rotational speed components currently acting on the vehicle 100 about the x, y, z axes of a resulting total rotational speed.

The rotational speed sensors of the sensor device 104 are affected by drift. The drift is compensated by compensation parameters. The compensation parameters can be determined during a standstill of the vehicle.

To detect the standstill, the device 102 reads at least the acceleration value $a_x$ and the rotational speed value $\omega_y$. In a filter device 106, high-frequency signal components are filtered out using a filter specification 108. The filtered acceleration value $a_{xf}$ and the filtered rotational speed value $\omega_{yf}$ will be normalized in a normalization device 110 using a normalization specification 112. The normalized acceleration value $a_{xn}$ and the normalized rotational speed value $\omega_{yn}$ will be observed in an observer 114 using an observation specification 116 to detect the standstill of the vehicle 100. If the standstill is detected, a standstill signal 118 is output. If the standstill signal 118 is read by the sensor device 104, the compensation parameter is adjusted.

In one exemplary embodiment, the acceleration value $a_y$ and the rotational speed value $\omega_z$ are also read in. In the filter device 106 the acceleration value $a_y$ and the rotational speed value $\omega_z$ are filtered. In the normalization device 110 the filtered acceleration value $a_{yf}$ and the filtered rotational speed value $\omega_{zf}$ are normalized. In the observer the normalized acceleration value $a_{yn}$ and the normalized rotational speed value $\omega_{zn}$ are observed to detect the standstill.

In one exemplary embodiment the acceleration values $a_x$, $a_y$, $a_z$ and alternatively or additionally the rotational speed values $\omega_x$, $\omega_y$, $\omega_z$ are averaged in the filter device 106 to filter out high frequency outliers. In this case, the acceleration values $a_x$, $a_y$, $a_z$ and the rotational speed values $\omega_x$, $\omega_y$, $\omega_z$ are averaged over a smoothing averaging period. The averaging period can be variable. For example, the averaging period can depend on whether the standstill or a movement of the vehicle 100 is detected.

In the filter device 106, acceleration ranges and/or rotational speed ranges can be determined. In this case, an acceleration range characterizes a variance of one of the acceleration values $a_x$, $a_y$, $a_z$ within an observation period, while a rotational speed range characterizes a variance of one of the rotational speed readings $\omega_x$, $\omega_y$, $\omega_z$ within an observation period. The observation period can correspond to the averaging period. The acceleration ranges and/or rotational speed ranges can be used in the observer 114 to detect a movement. In this process, the movement can be detected if an acceleration range and/or a rotational speed range is/are greater than a limit value.

In one exemplary embodiment a wheel speed value 120 is also read in by the observer 114. The wheel speed value 120 represents a wheel speed of at least one of the wheels of the vehicle 100. The standstill can be detected if the wheels are at a standstill.

In other words, vehicle standstill detection with dynamic detectors 114 is presented.

Standstill detection can be carried out by the ESP and based on the wheel signals 120, the yaw rate and status flags of the control unit.

For highly accurate positioning of a vehicle using inertial sensors 104, high quality of the sensor signals is required.

An offset of rotational speed sensors can be compared during a standstill. Importantly, during the standstill no high dynamics of the signal occur, as this has a negative impact on the compensation of the offsets.

In addition to the wheel speeds 120, the standstill detection presented here also uses three accelerations ax, ay, az and three rotational speed signals ωx, ωy, ωz to minimize the dynamics of the signals ax, ay, az, ωx, ωy, ωz during a standstill.

The sensitivity of the algorithm is increased by a suitable combination of acceleration signals ax, ay, az and rotational speed signals ωx, ωy, ωz, which in particular strongly correlate with each other during starting movements and deceleration movements. For example, the acceleration ax is strongly correlated with the rotational speed ωy and the acceleration ay is strongly correlated with the rotational speed ωz. Said so-called dynamic detectors 114 improve the performance of the algorithm such that the start off of the vehicle 100 can be detected faster and not changed to a standstill too early during the deceleration process.

The algorithm itself is mainly used for adjusting the sensor signals ax, ay, az, ωx, ωy, ωz during the estimation of the rotational speed offsets. The approach presented here can be used for a Vehicle Motion and Position Sensor (VMPS) 104.

In the dynamic detector 114 for ax and ωy, the change in the acceleration ax in the x-direction and the change in the rotational speed ωy about the y-axis are observed. The sensitivity of the algorithm can be increased by a suitable combination of both signals ax, ωy. The signals ax, ωy are initially normalized for a combination of both signals ax, ωy. A vehicle standstill is detected if the sum of the normalized change in the acceleration along the x-axis $\Delta a_{x,norm}$ and the normalized change in the rotational speed about the y-axis $\Delta \omega_{y,norm}$ is less than a set limit value. The challenge for the parameterization lies, among other things, in reducing the influence of high frequency outliers, but still not detecting dynamic influences that are produced by driving off slowly, for example. For this purpose, both signals ax, ωy are first averaged over a period of time tmov,dyn in order to reduce the influence of radio frequency disturbances and are then normalized.

For the normalization factor, the 4σ value for the noise of the respective signal from the specification was used. This clearly means that for a normal distribution, 95.45% are within this range. With a probability of 95.45% the normalized value $$\sigma_n = \frac{\sigma}{\sqrt{n}}$$

during the standstill is less than one. A value greater than one indicates high dynamics in the signal. Since a mean value filter is used for noise cancellation, the 4σ value can be modified to correspond to the standard deviation of the filtered signal. The standard deviation of an average value filtered signal can be calculated with.

In the dynamic detector 114 for ay and ωz, similarly to the previous condition the observation of the change in the acceleration ay in the y-direction and the change in the rotational speed ωz about the z-axis is considered. The normalized change in the acceleration is referred to as $\Delta a_{y,norm}$ and the normalized change in the rotational speed about the z-axis is referred to as $\Delta \omega_{z,norm}$.

In one exemplary embodiment, a range is monitored for the rotational speed at a standstill using a limit value. This condition is intended to detect slow driving off of the vehicle 100 in good time in addition to the dynamic detector 114. For this purpose, maximum and minimal values for ax and ay are determined during the standstill. In order to reduce the influence of high-frequency outliers again, the signals are first averaged over the time period tmov,drift. As soon as the spread or the range (max-min) of one of the two signals ax,range and ay,range exceeds a set limit, the standstill will be exited for a minimum time tmind. This is to ensure that there is no immediate change back to the standstill, as the dynamic detector 114 has not yet detected the slow drive off and is still signaling the standstill. It should be noted that the offset drifts of the acceleration signals ax, ay are negligibly small compared to said limit value.

In one exemplary embodiment, a range for the rotational speeds at a standstill is monitored using a limit value. Similarly to the previous condition, the standstill will be exited if one of the three ranges ωx,range, ωy,range or ωz,range exceeds a set limit value.

The wheel speeds 120 vrad can also be monitored using a limit value. For example, a vehicle standstill is detected if the wheel speeds 120 correspond to zero.

The standstill to is detected if no controller is active. It is ensured that no controller is active, such as the ABS for example, using so-called status flags.

Figure 2:
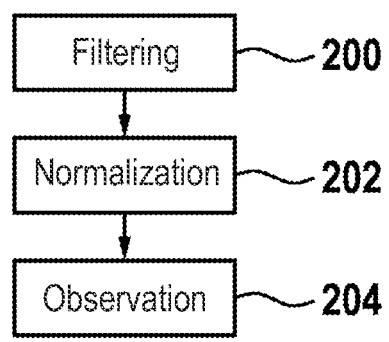
FIG. 2 shows a process diagram of a method for detecting a standstill of a vehicle according to an exemplary embodiment.

FIG. 2 shows a process diagram of a method for detecting a standstill of a vehicle according to an exemplary embodiment. The method can be implemented on a device as depicted in FIG. 1, for example. The method contains a filtering step 200, a normalizing step 202 and an observation step 204. In the filtering step 200, an acceleration value in a first axis of the vehicle and a rotational speed value about a second axis of the vehicle oriented orthogonally to the axis are filtered using a filter specification to obtain a filtered acceleration value and a filtered rotational speed value. In the normalization step 202 the filtered acceleration value and the filtered rotational speed value are normalized using a normalization specification to obtain a normalized acceleration value and a normalized rotational speed value. In the observation step 204 the normalized acceleration value and the normalized rotational speed value are observed using an observation specification to detect a standstill.

Figure 3:
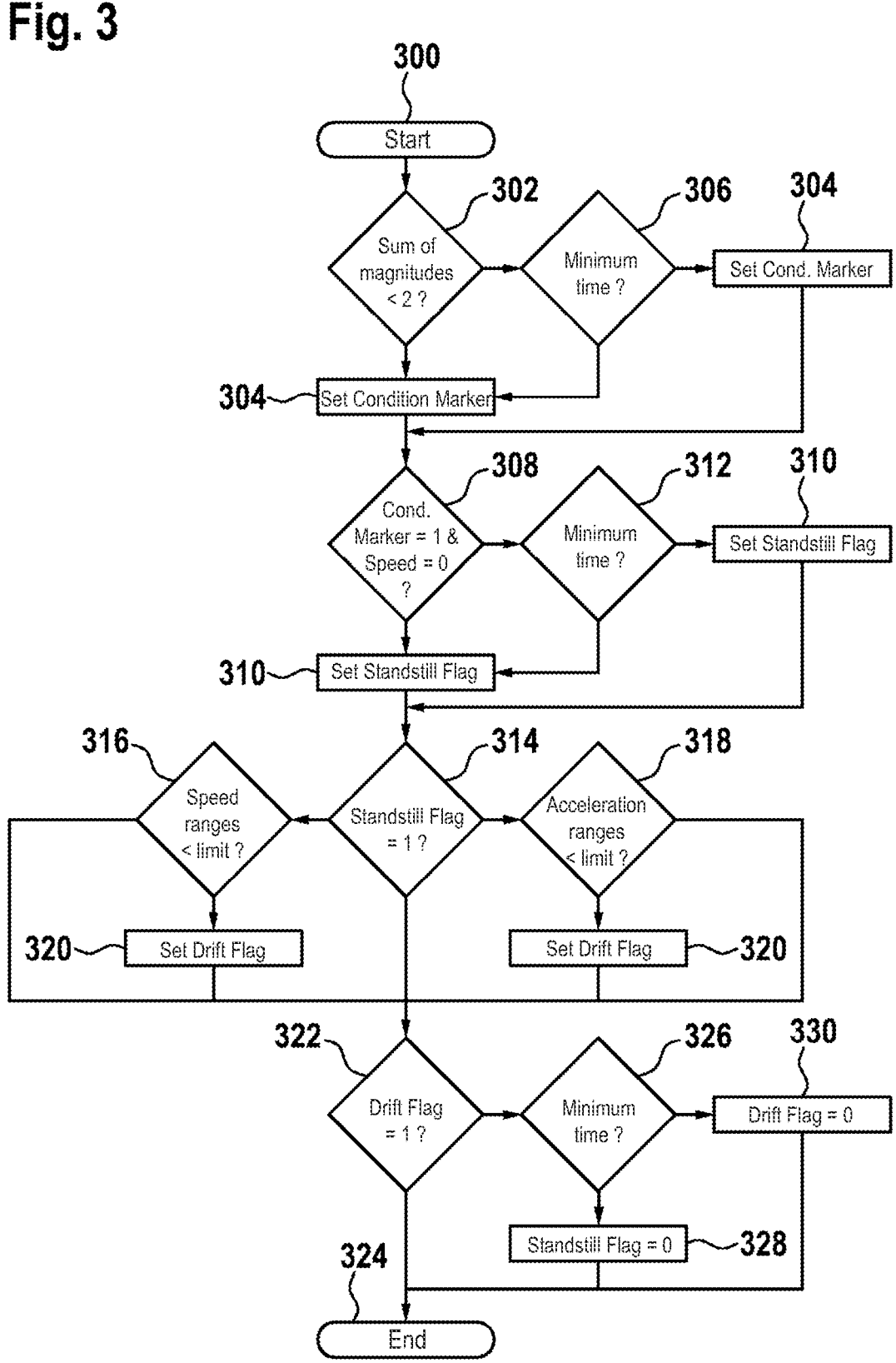
FIG. 3 shows a process diagram of a computer program for detecting a standstill of a vehicle according to an exemplary embodiment.

FIG. 3 shows a flow chart of a computer program for detecting a standstill of a vehicle according to an exemplary embodiment. The computer program can for example, be run on a device as depicted in FIG. 1. The computer program forms an exemplary embodiment of the method for detecting represented in FIG. 2. In particular, the observation step is presented here. After a program start 300, a first query 302 will be conducted.

The first query 302 checks whether a sum of the magnitudes of the change in the acceleration value in the x-axis and the change in the rotational speed value about the y-axis is less than two.

$$|\Delta a_{x,norm}| + |\Delta \omega_{y,norm}| < 2$$

It also checks whether a sum of the magnitudes of the change in the acceleration value in the y-axis and the change in the rotational speed value about the z-axis is less than two.

$$|\Delta a_{y,norm}| + |\Delta \omega_{z,norm}| < 2$$

If the conditions are not met, in a first action 304 a condition marker is set to be not met or to zero. If the conditions of the first query 302 are met, a second query 306 checks whether the conditions for a minimum period of time are met. In particular, the second query 306 checks whether the conditions are met for at least 300 milliseconds [ms]. If not, in the first action 304 the condition marker will also be set to be not met or to zero. If the conditions are met for at least the minimum time duration, in the first action 304 the condition marker will be set to met or to one.

Then, in a third query 308, a check is carried out as to whether the condition marker is set to met or to one and additionally the wheel speed equals zero.

$v_{Rad}=0$ m/s

If this is not the case, in a second action 310 a standstill flag is set to not met or to zero. If the condition marker is set to met or to one and additionally the wheel speed is zero, in a fourth query 112 a check is carried out as to whether the conditions are met for a minimum period of time. In particular, in the fourth query 306 a check is carried out as to whether the conditions are met for at least 300 ms. If not, in the second action 310 the standstill flag will also be set to not met or to zero. If the conditions are met for at least the minimum time period, in the second action 310 the standstill flag will be set to met or to one.

In a fifth query 314 a check is carried out as to whether the standstill flag is set to met or to one. If this is the case, two more queries 316, 318 will be conducted in parallel. The sixth query 316 checks whether the rotational speed ranges in all axes are less than a rotational speed range limit value. In particular, it checks whether the rotational speed ranges are less than 0.007 rad/s.

$\omega_{x,range} < 0.007$ rad/s $\omega_{y,range} < 0.007$ rad/s $\omega_{z,range} < 0.007$ rad/s The seventh query 318 checks whether the acceleration ranges in the x-axis and the y-axis are less than an acceleration range limit value. In particular, a check is carried out as to whether the acceleration ranges are less than 0.125 m/s².

$a_{x,range} < 0.125$ m/s²

$a_{y,range} < 0.125$ m/s²

If at least one of the rotational speed ranges is greater than the rotational speed range limit value and/or if at least one of the acceleration ranges is greater than the acceleration range limit value, in a third action 320 a drift flag is set to met or to one, wherein the standstill flag is set to not met or to zero.

If according to the fifth query 314 the standstill flag is set to not met or to zero, an eighth query 322 checks whether the drift flag is set to met or to one. If the drift flag is set to not met or to zero, a program end 324 is carried out. If the drift flag is set to met or to one, a ninth query 326 checks whether the drift flag is set to met or to one for a minimum time period. In particular, the fourth query 306 checks whether the drift flag is set to met or to one for 1000 ms. As long as the drift flag is set to met or to one for less than 1000 ms, in a fourth action 328 the standstill flag is set to not met or to zero. This is followed by the end of the program 324. If the drift flag is set to met or to one for more than 1000 ms, in a fifth action 330 the drift flag is set to not met or to zero. This is followed by the end of the program 324.

Figure 4:
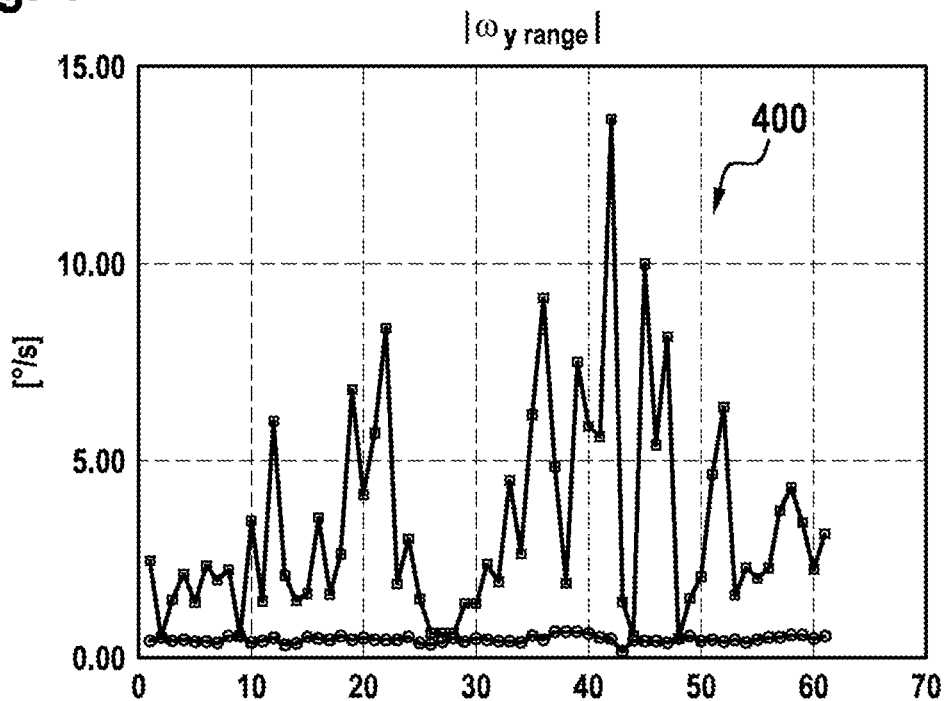
Figure 5:
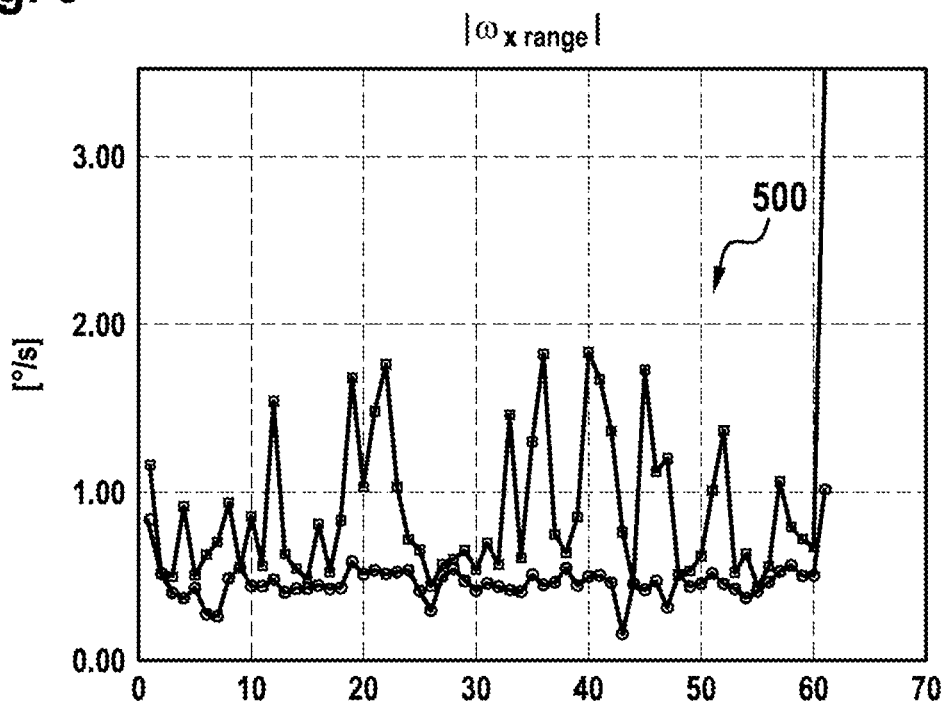
Figure 6:
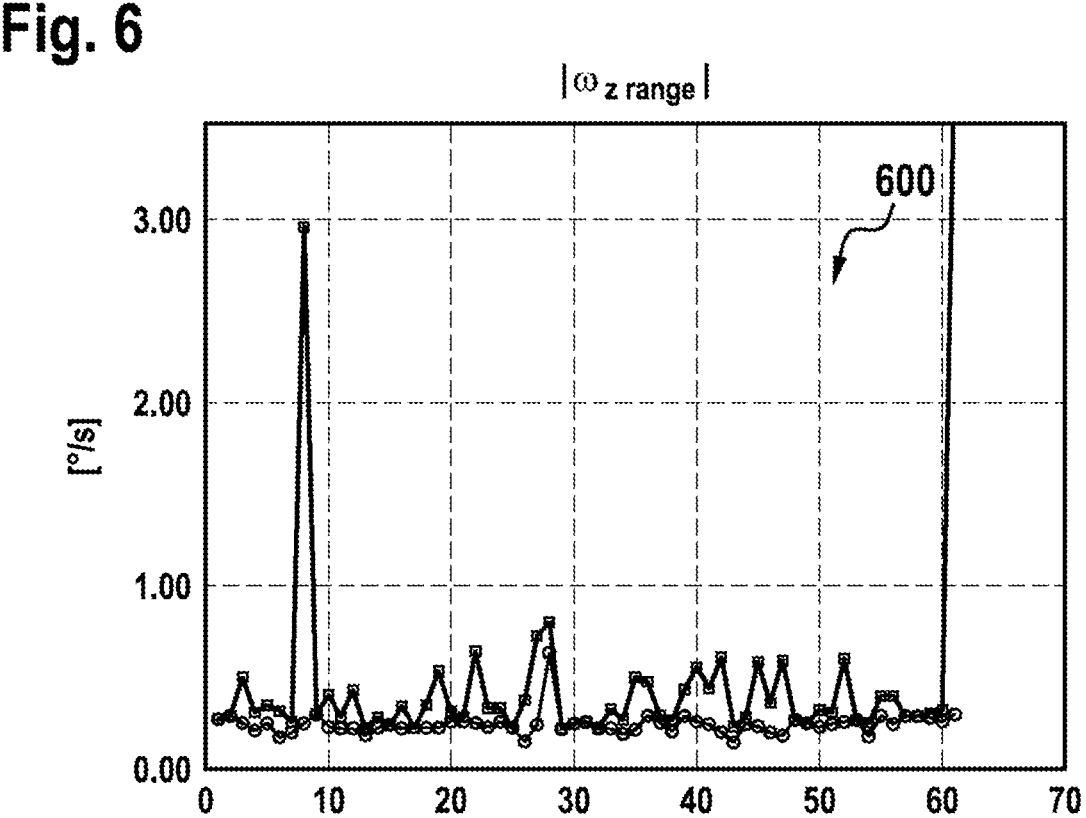

FIGS. 4 to 7 show representations of signal profiles during detection of a standstill of a vehicle according to an exemplary embodiment. In FIGS. 4 to 6, ranges 400, 500, 600 of rotational speed values of different axles are plotted over a number of measurements. The ranges 400, 500, 600 are plotted per axis in a chart, wherein the progressive measurement number is plotted on the abscissa and the rotational speed in degrees per second [°/s] is plotted on the ordinate.

In FIG. 4 the rotational speed range 400 about the y-axis is shown. In FIG. 5 the rotational speed range 500 about the x-axis is shown. In FIG. 6 the rotational speed range 600 about the z-axis is shown. When using the approach presented here, a significantly reduced range 400, 500, 600 results over many measurements.

In FIG. 7 a comparison of standstill detection between a conventional approach and the approach presented here is shown. For this purpose, signal profiles 700, 702, 704, 706 are shown in four time-correlated diagrams. The first signal profile 700 shows acceleration values ax, the second signal profile 702 shows rotational speed values ωy, the third signal profile 704 shows a binary standstill flag and the fourth signal profile 706 shows rotational speed values ωy. The signal profiles 700, 702, 704 are based on the conventional approach. The fourth signal profile 706 is based on the approach presented here.

In other words, FIGS. 4 to 7 show signal comparisons between the ESP-based approach and the standstill detection presented here using dynamic detectors. For the comparison of the two algorithms, 61 real measurement trips were used. A VW Golf with an MM7 inertial sensor system was used as a test carrier.

The graphics in FIGS. 4 to 6 show the difference between the maximum and minimum signal values during the detected standstill.

In FIG. 7 a representative record of a measurement trip is shown.

The signal profile 700 represents the acceleration ax masked with the ESP standstill algorithm. The signal profile 702 represents the rotational speed ωy masked with the ESP standstill algorithm. The signal profile 704 represents the ESP standstill signal, wherein a "1" represents a standstill and a "0" represents no vehicle standstill.

The signal profile 706 represents the rotational speed ωy masked with the standstill detection presented here with the dynamic detector. The correlation between the rotational speed ωy and the acceleration ax is striking. The ESP approach detects the standstill too soon and detects slow driving off too late. The standstill detection with dynamic detectors presented here shows a significantly better performance.

One exemplary embodiment includes an "and/or" link between a first feature and a second feature, so this is to be read such that the exemplary embodiment according to one embodiment comprises both the first feature and the second feature and according to a further embodiment comprises either only the first feature or only the second feature.

The invention claimed is:

1. A method for detecting whether a vehicle is in standstill, the method comprising:
   filtering, (i) an acceleration value in a first axis of the vehicle to obtain a filtered acceleration value in the first axis and (ii) a rotational speed value about a second axis of the vehicle that is oriented orthogonally to the first axis to obtain a filtered rotational speed value in the second axis;
   normalizing (i) the filtered acceleration value in the first axis by transforming the filtered acceleration value in the first axis using a respective normalization factor to obtain a normalized acceleration value in the first axis and (ii) the filtered rotational speed value in the second axis by transforming the filtered rotational speed value in the second axis using a respective normalization factor to obtain a normalized rotational speed value in the second axis;

determining a first sum of the normalized acceleration value in the first axis and the normalized rotational speed value in the second axis; and detecting whether the vehicle is in standstill depending on the first sum.

2. The method as claimed in claim 1 further comprising:

averaging, over a drift time period, when the standstill is detected, at least one of (i) the acceleration value in the first axis to obtain an acceleration range and (ii) the rotational speed value in the second axis to obtain a rotational speed range, wherein the detecting further comprises detecting a movement of the vehicle in response to at least one of the acceleration range and the rotational speed range exceeding a limit value.

3. The method as claimed in claim 1, the filtering further comprising:

averaging, over a dynamic time period, at least one of (i) the acceleration value in the first axis to obtain the filtered acceleration value in the first axis and (ii) the rotational speed value in the second axis to obtain the filtered rotational speed value in the second axis, in response to a movement of the vehicle being detected.

4. The method as claimed in claim 1, the detecting further comprising:

detecting that the vehicle is not in standstill in response to a movement of the vehicle having been detected within a minimum time period.

5. The method as claimed in claim 1, the detecting further comprising:

detecting the standstill in response to the first sum being less than a threshold value.

6. The method as claimed in claim 1, wherein:

the filtering further comprises filtering (i) a further acceleration value in the second axis to obtain a further filtered acceleration value in the second axis and (ii) a further rotational speed value about a third axis of the vehicle that is oriented orthogonally to the first axis and the second axis to obtain a further filtered rotational speed in the third axis;

the normalizing further comprises normalizing (i) the further filtered acceleration value by transforming the further filtered acceleration value in the second axis using a respective normalization factor to obtain a further normalized acceleration value in the second axis and (ii) the further filtered rotational speed value by transforming the further filtered rotational speed value in the third axis using a respective normalization factor to obtain a further normalized rotational speed value in the third axis; and the detecting further comprises detecting whether the vehicle is in standstill based on the further normalized acceleration value in the second axis and the further normalized rotational speed value in the third axis.

7. The method as claimed in claim 1, the detecting further comprising:

detecting that the vehicle is in standstill in response to a wheel rotational speed value representing a wheel rotation speed of at least one wheel of the vehicle being less than a threshold value.

8. The method as claimed in claim 1, the detecting further comprising:

detecting that the vehicle is in standstill in response to no controller of the vehicle being active.

9. A device for detecting whether a vehicle is in standstill, the device comprising:

a sensor interface configured to receive acceleration values from an acceleration sensor and rotational speed values from a rotational speed sensor;

a memory; and a processor configured to:

filter (i) an acceleration value in a first axis of the vehicle to obtain a filtered acceleration value in the first axis and (ii) a rotational speed value about a second axis of the vehicle that is oriented orthogonally to the axis to obtain a filtered rotational speed value in the second axis;

normalize (i) the filtered acceleration value in the first axis by transforming the filtered acceleration value in the first axis using a respective normalization factor to obtain a normalized acceleration value in the first axis and (ii) the filtered rotational speed value in the second axis by transforming the filtered rotational speed value in the second axis using a respective normalization factor to obtain a normalized rotational speed value in the second axis;

determine a first sum of the normalized acceleration value in the first axis and the normalized rotational speed value in the second axis; and detect whether the vehicle is in standstill depending on the first sum.

10. A non-transitory machine-readable storage medium configured to store computer program for detecting whether a vehicle is in standstill, the computer program being configured to, when executed by a processor, cause the processor to:

filter, (i) an acceleration value in a first axis of the vehicle to obtain a filtered acceleration value in the first axis and (ii) a rotational speed value about a second axis of the vehicle that is oriented orthogonally to the axis to obtain a filtered rotational speed value in the second axis;

normalize (i) the filtered acceleration value in the first axis by transforming the filtered acceleration value in the first axis using a respective normalization factor to obtain a normalized acceleration value in the first axis and (ii) the filtered rotational speed value in the second axis by transforming the filtered rotational speed value in the second axis using a respective normalization factor to obtain a normalized rotational speed value in the second axis;

determine a first sum of the normalized acceleration value in the first axis and the normalized rotational speed value in the second axis; and detect whether the vehicle is in standstill depending on the first sum.

11. The method as claimed in claim 6 further comprising:

determining a second sum of the further normalized acceleration value in the second axis and the further normalized rotational speed value in the third axis, wherein the detecting further comprises detecting whether the vehicle is in standstill further depending on the second sum.

* * * * *